United States Patent
Puleri et al.

(10) Patent No.: US 12,212,538 B2
(45) Date of Patent: Jan. 28, 2025

(54) COMMUNICATION BETWEEN A CONTROLLER AND A CONTROLLED DEVICE OVER A WIRELESS NETWORK

(71) Applicant: Telefonaktiebolaget LM Ericsson (PUBL), Stockholm (SE)

(72) Inventors: Marzio Puleri, Pisa (IT); Teresa Pepe, Pisa (IT); Simona Catalano, Pisa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 534 days.

(21) Appl. No.: 17/283,074

(22) PCT Filed: Oct. 11, 2018

(86) PCT No.: PCT/EP2018/077771
§ 371 (c)(1),
(2) Date: Apr. 6, 2021

(87) PCT Pub. No.: WO2020/074084
PCT Pub. Date: Apr. 16, 2020

(65) Prior Publication Data
US 2021/0385188 A1    Dec. 9, 2021

(51) Int. Cl.
*H04L 61/2514* (2022.01)
*H04W 28/08* (2023.01)
*H04W 72/12* (2023.01)

(52) U.S. Cl.
CPC ......... *H04L 61/2514* (2013.01); *H04W 28/08* (2013.01); *H04W 72/12* (2013.01)

(58) Field of Classification Search
CPC ................ H04L 61/2514; H04W 28/0289
(Continued)

(56) References Cited

U.S. PATENT DOCUMENTS 8,018,900 B2 * 9/2011 Blanchette ............. H04L 45/66
                                                              370/401
9,379,906 B2    6/2016 Sharma et al.
(Continued)

FOREIGN PATENT DOCUMENTS

CN    1866914 A    11/2006
CN    1894900 A    1/2007
(Continued)

OTHER PUBLICATIONS

Grant of Patent issued for Patent application No. Japanese Patent Application 2021-519166—Sep. 27, 2022.
(Continued)

*Primary Examiner* — Hermon Asres
(74) *Attorney, Agent, or Firm* — Baker Botts L.L.P.

(57) ABSTRACT

A method of communication between a controlled device and a controller over a 3GPP wireless network performed at a source interface device. The method comprises: splitting (102) an incoming traffic into a first path carrying a native ethernet traffic and a second path carrying an IP, internet protocol, traffic; remapping (106) IP addresses of packets of the IP traffic with an IP address of a destination interface device at a remote end of the 3GPP wireless network; encapsulating (104) the native ethernet traffic into IP traffic with the IP address of the destination interface device at a remote end of the 3GPP wireless network and scheduling (108) IP traffic from said first path and said second path for transmission (110) to the destination interface device via the 3GPP wireless network.

14 Claims, 7 Drawing Sheets

(58) Field of Classification Search
USPC .......................................................... 709/239
See application file for complete search history.

(56) References Cited

U.S. PATENT DOCUMENTS

| | | | |
|---|---|---|---|
| 10,055,793 | B1 | 8/2018 | Call et al. |
| 2003/0063611 | A1 | 4/2003 | Schaub et al. |
| 2003/0210663 | A1 | 11/2003 | Everson et al. |
| 2007/0153741 | A1 | 7/2007 | Blanchette et al. |
| 2007/0189158 | A1* | 8/2007 | Kulmala ................. H04L 41/00 370/229 |
| 2012/0014284 | A1 | 1/2012 | Ranganathan et al. |
| 2013/0121346 | A1 | 5/2013 | Mitchell et al. |
| 2013/0182708 | A1* | 7/2013 | Sharma ............... H04L 12/4625 370/392 |

FOREIGN PATENT DOCUMENTS

| | | |
|---|---|---|
| CN | 101005644 A | 7/2007 |
| CN | 101310487 A | 11/2008 |
| CN | 101925042 A | 12/2010 |
| CN | 103004167 A | 3/2013 |
| CN | 104067256 A | 9/2014 |
| CN | 204883352 U | 12/2015 |
| CN | 107409121 A | 11/2017 |
| EP | 2 442 514 A1 | 5/2010 |
| EP | 2 416 533 A1 | 2/2012 |
| EP | 2 528 281 A1 | 11/2012 |
| EP | 2 549 781 A1 | 1/2013 |
| GB | 2557249 A | 6/2018 |
| JP | 2015-111754 A | 6/2015 |
| WO | 2013 070284 A1 | 5/2013 |
| WO | WO2018100383 A1 | 6/2018 |

OTHER PUBLICATIONS

PCT Notification of Transmittal of the International Search Report and the Written Opinion of the International Searching Authority, or the Declaration issued for International application No. PCT/EP2018/077771—Jun. 25, 2019.

Office Action issued for Chinese Patent Application Serial No. 201880098588.5—Dec. 1, 2023.
"Virtual extensible Local Area Network (Vxlan): A Framework for Overlaying Virtualized Layer 2 Networks over Layer 3 Networks", RFC 7348, Aug. 2014, pp. 1-22.
Office Action received for Japanese Patent Application No. 2021-519166, mailed on May 31, 2022, 04 pages including English translation.
Search Report received for Japanese Patent Application No. 2021-519166, mailed on May 23, 2022, 54 pages including English translation.
Search Report received for Japanese Patent Application No. 2022-169105, mailed on Nov. 22, 2023, 36 pages including English translation.
Office Action received for Japanese Patent Application No. 2022-169105, mailed on Dec. 5, 2023, 06 pages including English translation.
Extended European Search Report received for European Patent Application No. 22169286.6, mailed on Jul. 8, 2022, 06 pages.
Intention to Grant received for European Patent Application No. 18789034.8, mailed on Jan. 25, 2022, 72 pages.
Decision to Grant received for European Patent Application No. 18789034.8, mailed on May 6, 2022, 02 pages.
Intention to Grant received for European Patent Application No. 22169286.6, mailed on May 8, 2023, 75 pages.
Decision to Grant received for European Patent Application No. 22169286.6, mailed on Sep. 7, 2023, 02 pages.
Decision to Grant received for Japanese Patent Application No. 2022-169105, mailed on May 21, 2024, 05 pages including English translation.
Notice of Grant received for Chinese Patent Application No. 201880098588.5, mailed on Feb. 28, 2024, 03 pages including English translation.
Intention to Grant received for European Patent Application No. 18789034.8, mailed on Dec. 17, 2021, 71 pages.
International preliminary report on patentability received for International Patent Application No. PCT/EP2018/077771, mailed on Apr. 22, 2021, 07 pages.
Standardization of Kazuhiro Kusunoki and a measurement control network The open field bus for factory automation (FA), measurement and control, Society of Instrument and Control Engineers, Jun. 10, 2005, the 44th vol. No. 6, 365-370 (translation not available).

* cited by examiner

COMMUNICATION BETWEEN A CONTROLLER AND A CONTROLLED DEVICE OVER A WIRELESS NETWORK

PRIORITY

This nonprovisional application is a U.S. National Stage Filing under 35 U.S.C. § 371 of International Patent Application Serial No. PCT/EP2018/077771 filed Oct. 11, 2018 and entitled "Communication Between A Controller And A Controlled Device Over A Wireless Network" which is hereby incorporated by reference in its entirety.

TECHNICAL FIELD

The present invention relates to communication between a controlled device and a remote controller, in general, and in particular to a method and an interface device for such communication over a 3GPP wireless network.

BACKGROUND

The factory of the future will be realized through digitization of the manufacturing process and plants. The digital transformation starts by connecting the previously isolated devices and systems in a factory to increase the flexibility of the manufacturing process. Manufacturers want to personalize their production to maximize the product output, without sacrificing sustainability, flexibility, traceability, or safety. New cloud driven robotic devices able to communicate with each other and with humans will be required.

In typical industrial environments, the production line is composed of various work cells, each dedicated to making a specific part of the product. The production line is controlled by a Programmable Logic Controller (PLC) that coordinates and assigns tasks to each work cell. A work cell or production station is a complete system that includes robotic devices, conveyors, and other peripherals such as a part positioners and safety environment. An entire work cell is controlled by a station PLC. Each robotic device has its own robot controller managed by the station PLC.

A PLC is a specialized computer used to control machines and processes. It therefore shares common terms with typical PCs like central processing unit, memory, software and communications. Unlike a personal computer though the PLC is designed to survive in a rugged industrial atmosphere and to be very flexible in how it interfaces with inputs and outputs to the real world. The PLC continuously monitors a system, processing input signals (e.g. from switches, sensors and robotic devices) into outputs (e.g. motor commands, robot commands, LEDs, relays, etc.) and takes necessary action in connection with a controlled process to guarantee that all steps in a sequential process are executed in a proper sequence.

The station PLC communicates with different devices, as remote I/O (input/output), other PLCs (e.g. PLC for a production line) and robot controllers, and so on. All these communications require a physical connection, which is the wiring and connection components, and a shared protocol, which is the common language allowing communication among networked devices. Communication protocols, e.g. Fieldbus, describe the set of rules to be used in communication between devices. The list of protocols used in today's industrial robotics is quite large, many of the protocols used are based on either Ethernet and/or IP networking or serial cables with proprietary networking protocols. The communication protocols used in industrial robotics vary mostly from the features of the application layer (upper layer), although the performance is often determined by the physical layer (lowest layer). The major Ethernet-based protocols used in the industry are EtherNet/IP, Modbus TCP/IP, Profinet, EtherCAT.

Industrial protocols handle different types of communication to perform their function. For example, PROFINET IO uses different communication channels to exchange data with programmable Controllers and other devices:

Real-time (RT) communication—The I/O and alarm data are transferred over the real-time PROFINET IO Channel. RT data can be:
RT Acyclic data—Unscheduled, on demand communications. Diagnostic messages from an IO Supervisor to an I/O Device are acyclic;
RT Cyclic data—Scheduled, repetitive communications. I/O data and alarm transfers are cyclic.
Non-real-time communication—Configuration and diagnostic messages are transferred over the non-real-time PROFINET IO Channel.

Industrial communication, especially in production and process automation, requires a punctual and deterministic data transmission. For this reason, for the cyclic exchange of time-critical I/O user data, PROFINET IO does not use TCP/IP, since it is not fast and deterministic as the Profinet application requires, but pure Ethernet traffic. TCP/UDP is mainly used for startup configuration and is rare, however with preventive monitoring its use will increase.

Today, the production lines are based on rigid wired networks, using Ethernet connections. However, since a mature plant has up to 1000 moving parts plus many more devices and sensors, data traffic can no longer be supported by the existing wired internal networks, thus current plant networks start to develop bottlenecks.

Adding a second wired network in support of the legacy one is possible, but it is not easy to integrate both networks. At the same time the complete re-cabling of the plant, for example using optical fibers could be too expansive.

Therefore, in such scenarios wireless connectivity seem to be the best solution. On the market, the currently available solutions don't cover the communication between PLC and robotic devices for operating the robots. Instead, they are focused on monitoring and general management functions towards the top layer SCADA (Supervisory Control And Data Acquisition) for remote access to a variety of local control modules. Sensors can be connected as clients to a remote server via LTE and, in some cases, the PLC can communicate via LTE towards SCADA.

This kind of connectivity follows the classic IoT scheme where an IP client gets in touch with a remote server where some management/monitoring functions run. Examples of Industrial IoT LTE based are, for instance, the one provided by Siemens, Sierra Wireless and Moxa.

The Siemens' SCALANCE M876-4 LTE (UE) is a 4G-Router for wireless IP communication based on ethernet via LTE. Even though Siemens states it supports the Profinet protocol, it limits this support only to the IP traffic of the protocol used for monitoring and management only. The real time native ethernet Profinet traffic used to control robotic devices is not supported.

Similarly, also the devices provided by other manufacturers like Sierra Wireless (e.g. Airlink RV50 Industrial LTE gateway) allow only an IP connectivity handled by a local router to the LTE and a remote application server where, for instance, SCADA runs. So, they allow the connection between the PLC and the upper layers for monitoring and management/configuration purposes, but they are not suitable for the runtime control of robotic devices in a work cell by its PLC.

Another device that can be used is an LTE gateway, like the one provided by Moxa (e.g. OnCell G3470A-LTE Series-Industrial LTE cellular gateway). Using a VPN connectivity between the client and the server, it is possible to connect the same LAN on both sides. In this solution a VPN is used, since the solution is supposed to be used to connect some devices like sensors and PLCs to a remote management and monitoring system. Passing through the internet, the VPN with IPsec provides a good level of encryption. Again, connecting a PLC directly to the robotic devices is not supported.

As discussed above additional cabling (electrical or optical) to provide connectivity to hundreds of robots, sensors and their controllers is impractical and too expensive. Therefore, wireless connectivity is going to be deployed to reduce costs and simplify infrastructure.

At the same time, current Wi-Fi is not viable in a factory environment for several motivations:
- It is a "best effort" communication technology on a shared spectrum, not robust to the co-channel interference due to the presence of multiple access points competing for bandwidth.
- The scalability required in a factory (e.g. for adding new sensors and devices) cannot be ensured by Wi-Fi because performance degrades with the number of connected devices.
- It's not easy to make a stable Wi-Fi coverage planning of the plant because a "signal strength mapping" is quite inaccurate and can be dynamically affected by "objects" moving around the shop floor.
- WiFi can be affected by the interference that comes from the machinery in the factory and high traffic load.

SUMMARY

It is the object of the present invention to obviate at least some of the above disadvantages and provide an improved method and an interface device for communication between a controlled device and a remote controller over a 3GPP wireless network.

Accordingly, the invention seeks to preferably mitigate, alleviate or eliminate one or more of the disadvantages mentioned above singly or in any combination.

According to a first aspect of the present invention there is provided a method of communication between a controlled device and a controller over a 3GPP wireless network. The method, performed at a source interface device, comprises splitting an incoming traffic into a first path carrying a native ethernet traffic and a second path carrying an IP, internet protocol, traffic. The method also comprises remapping IP addresses of packets of the IP traffic with an IP address of a destination interface device at a remote end of the 3GPP wireless network and encapsulating the native ethernet traffic into IP traffic with the IP address of the destination interface device at a remote end of the 3GPP wireless network. The method further comprises scheduling IP traffic from said first path and said second path for transmission to the destination interface device via the 3GPP wireless network.

According to a second aspect of the present invention there is provided a method of communication between a controlled device and a controller over a 3GPP wireless network. The method, performed at a destination interface device, comprises splitting an incoming traffic into a third path carrying a native ethernet traffic encapsulated in an IP, internet protocol, packets and a fourth path carrying an IP traffic. The method also comprises remapping IP addresses of packets of the IP traffic on the fourth path with an IP address of at least one controlled device or controller and decapsulating the native ethernet traffic from the IP traffic on the third path. The method further comprises scheduling traffic from said third path and said fourth path for transmission to the at least one controlled device or controller connected to the destination interface device.

According to a third aspect of the present invention there is provided an interface device for communication between a controlled device and a controller over a 3GPP wireless network. The interface device is adapted to split an incoming traffic into a first path carrying native ethernet traffic and a second path carrying IP, internet protocol, traffic. The interface device is also adapted to remap IP addresses of packets of the IP traffic with an IP address of a destination interface device at a remote end of the 3GPP wireless network and to encapsulate the native ethernet traffic into IP traffic with the IP address of the destination interface device at a remote end of the 3GPP wireless network. Further, the interface device is adapted to schedule IP traffic from the first path and the second path for transmission to the destination interface device via the 3GPP wireless network.

According to a fourth aspect of the present invention there is provided an interface device for communication between a controlled device and a controller over a 3GPP wireless network. The interface device is adapted to split an incoming traffic into a third path carrying native ethernet traffic encapsulated in an IP, internet protocol, packets and a fourth path carrying IP traffic. The interface device is also adapted to remap IP addresses of packets of the IP traffic on the fourth path with an IP address of at least one controlled device or controller and to decapsulate the native ethernet traffic from the IP traffic on the third path. Further, the interface device is adapted to schedule traffic from the third path and the fourth path for transmission to the at least one controlled device or controller connected to the interface device.

According to a fifth aspect of the present invention there is provided an interface device for communication between a controlled device and a controller over a 3GPP wireless network. The interface device comprises a processing circuitry and a memory, the memory contains instructions executable by the processing circuitry such that the interface device is operable to split an incoming traffic into a first path carrying native ethernet traffic and a second path carrying IP, internet protocol, traffic. The interface device is also operable to remap IP addresses of packets of the IP traffic with an IP address of a destination interface device at a remote end of the 3GPP wireless network and to encapsulate the native ethernet traffic into IP traffic with the IP address of the destination interface device at a remote end of the 3GPP wireless network. Further, the interface device is operable to schedule IP traffic from the first path and the second path for transmission to the destination interface device via the 3GPP wireless network.

According to a sixth aspect of the present invention there is provided an interface device for communication between a controlled device and a controller over a 3GPP wireless network. The interface device comprises a processing circuitry and a memory, the memory contains instructions executable by the processing circuitry such that the interface device is operable to split an incoming traffic into a third path carrying native ethernet traffic encapsulated in an IP, internet protocol, packets and a fourth path carrying IP traffic. The interface device is also operable to remap IP addresses of packets of the IP traffic on the fourth path with an IP address of at least one controlled device or controller and to decapsulate the native ethernet traffic from the IP traffic on the third path. Further, the interface device is operable to schedule traffic from the third path and the fourth path for transmission to the at least one controlled device or controller connected to the interface device.

Further features of the present invention are as claimed in the dependent claims.

The present invention provides numerous benefits, some of them are briefly mentioned now. The method and the device in their various embodiments are agnostic with respect to industrial protocols. The solution provides compatibility of 4G and 5G wireless communications with industrial protocols. It allows for reduction of infrastructure cost by eliminating the need for cable connections and increases flexibility of a production line by virtualizing functions. The removal of cabling fosters the transfer of the station PLCs functionalities to run in a remote place on servers in a local cloud, giving the possibility of exploiting the computational power provided by such machines, much more powerful than PLCs. Consequently, more flexible and sophisticated control functions can be introduced. This solution also reduces stop-time needed for rearrangement of an assembly line because there is no need to rearrange the cabling.

BRIEF DESCRIPTION OF THE DRAWINGS

The present invention will be understood and appreciated more fully from the following detailed description taken in conjunction with the drawings in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Many of the problems with WiFi connections can be addressed by using LTE wireless connections. However, if there are more stringent requirements from the point of view of bandwidth and latency then 5G wireless connectivity, with its standardized networking capabilities, built-in security, guaranteed grades of service as well as network slicing concepts, is the best solution for advanced industries that want to take advantage of digital transformation.

However, the inventors realised that when Profinet or EtherCAT protocol, that transport I/O and robot control traffic only directly within the standard IEEE 802.3 Ethernet frame, are used, the compatibility issues between industrial protocols that are transported on Ethernet and the IP-based network architecture of LTE/5G, become apparent. Thus, it is fundamental to solve compatibility issues between industrial protocols (e.g., Profinet, Ethercat) and LTE/5G communication to use wireless connectivity for the industrial communication.

Since the vast majority of industrial devices are designed to respond to commands rather than initiate them, this is an issue for IP communication. A user or master device on the Internet will not be able to initiate contact with an industrial device or sensor that is assigned a dynamic IP address. To address this IP address issue, IP tunneling using VXLAN (Virtual eXtensible Local Area Network), VPN (Virtual Private Network) or similar techniques can be used.

However, tunneling doesn't optimize the transport of traffic. Everything is tunneled having both native ethernet (e.g. profinet RT and ethercat RT traffic) and native IP traffic (e.g. configuration, maintenance and monitoring) encapsulated. In this way native IP traffic is packed into another IP stream doubling the overhead and leading to a waste of bandwidth.

For the native ethernet traffic to be transported over an IP network encapsulation is a must, but not for native IP traffic which could be handled more efficiently. However, also the IP (TCP and UDP) traffic must be handled in a proper way, that isn't supported today. If encapsulation is to be avoided, there is the need for remapping IP address and port number to the one used by the mobile network to connect the device and NAT (Network Address Translation) functions are not suitable for this task.

The inventors realised that what is missing today for an optimized industrial communication is the possibility of separating native ethernet traffic from native IP traffic coming from the same source (having the same MAC address), so to treat differently ethernet from IP, encapsulating ethernet and remapping IP.

Further, the inventors realised that separating the traffic flows between native ethernet, transporting real time traffic, and real time traffic in general, from the IP based monitoring and management traffic, can reduce jitter on time critical services.

This document discloses a method and an interface device that allows controlled devices to communicate in an optimized way with a remote controller (that could run into the cloud) using wireless connectivity provided by a 4G or 5G wireless network.

The interface device is able to receive industrial ethernet traffic (e.g. Profinet, EtherCAT), adapt it to be sent via mobile wireless communication in an efficient way by encapsulating native ethernet and remapping IP traffic. A further mapping of this traffic flows in communication classes (CBR, VBR, UBR) can be introduced to reduce jitter over time critical services in case of mobile network congestion or limited uplink rate with respect to robotic LAN rate (e.g. due to category of the 4G/5G wireless module).

Figure 1:
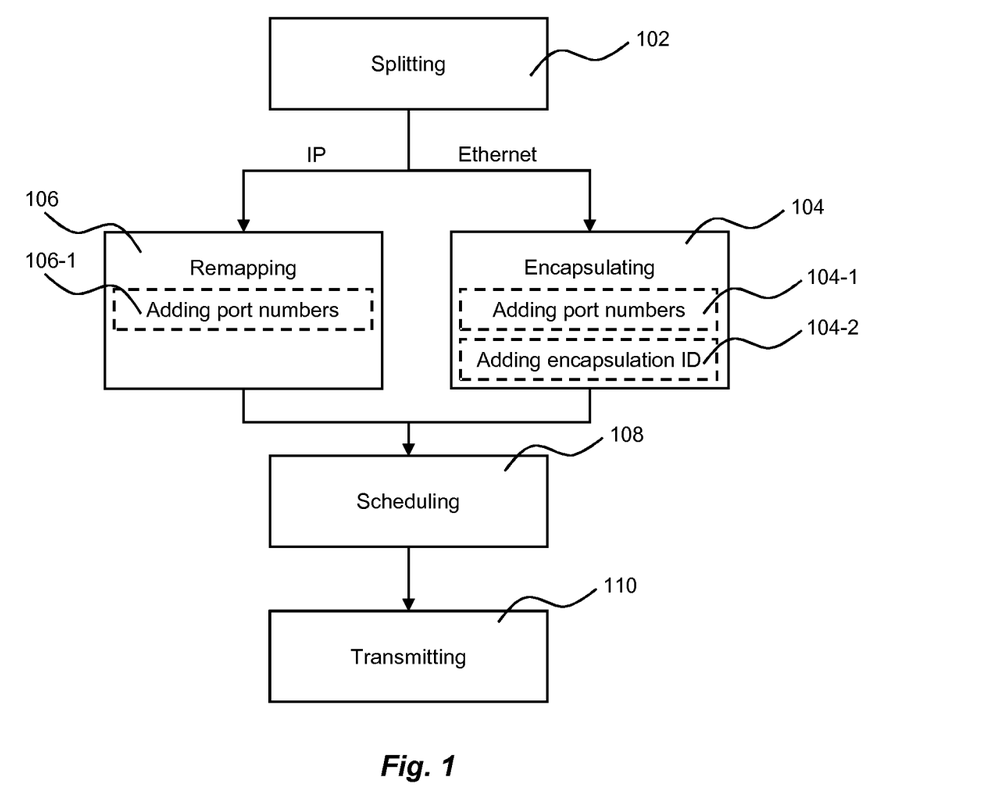
FIG. 1 is a flow chart illustrating a method of communication between a controlled device and a controller over a 3GPP wireless network in one embodiment of the present invention.

With reference to FIG. 1 one embodiment of a method of communication between a controlled device and a controller over a 3GPP wireless network will now be described. The controlled device may be, for example, a robot, a device in a robotic cell or a sensor, whereas the controller may be, for example, a Programmable Logic Controller (PLC). The 3GPP wireless network may be, for example, an LTE (Long Term Evolution) network, also known as, 4G network or a 5G network. The method is described in a context of an example of a simple implementation illustrated in FIG. 5 in which a robot, 508, is located remotely from its PLC controller, 502. The PLC, 502, is connected to a first interface device, 504, and the robot, 508, is connected to a second interface device, 506. The connections between the PLC and the first interface device as well as robot and second interface device may be realised over the same local network in a manufacturing plant via, for example, an electrical or optical cable. The PLC and robot (and their locally connected interface devices 504 and 506) may be located in the same building, in different buildings or even at more distant locations. Communication between the interface devices 504 and 506 is realised over a 3GPP wireless network, 520, e.g. 4G or 5G network.

Figure 5:
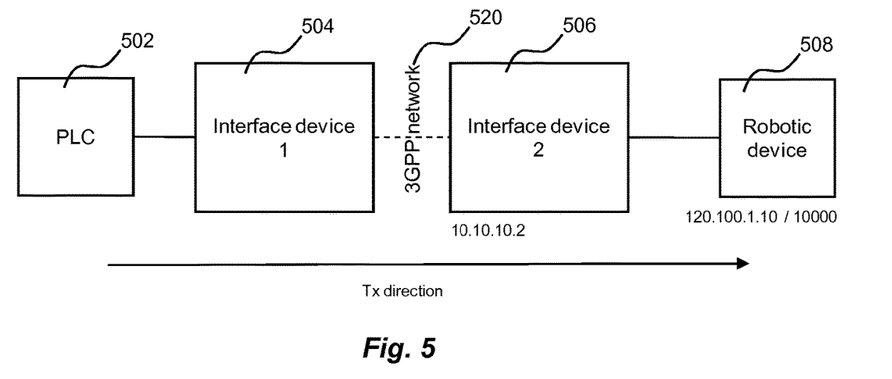
FIGS. 5 and 6 illustrate interface devices for communication between a controlled device and a controller over a 3GPP wireless network in operation.

In operation, the PLC, 502, may send traffic comprising, for example control commands as well as configuration and management traffic to the robot, 508, it controls. The method of communication between the PLC, 502, and the robot, 508, over the 3GPP wireless network, 520, is performed at the first interface device, 520. When the first interface device, 520, transmits traffic from the PLC, 502, to the robot, 508, connected to the second interface device, 506, the first interface device, 504, may be referred to as a source interface device and the second interface device, 506, may be referred to as a destination interface device.

The method performed at a source interface device, 504, comprises splitting, 102, an incoming traffic into a first path carrying a native ethernet traffic and a second path carrying an IP, internet protocol, traffic. The IP traffic has then IP addresses of its packets remapped, 106, with an IP address of a destination interface device, 506, at a remote end of the 3GPP wireless network. The native ethernet traffic, on the other hand, is encapsulated into IP traffic by adding IP headers to the ethernet frames, wherein the IP headers comprise the IP address of the destination interface device, 506, at the remote end of the 3GPP wireless network. Preferably, the operations of remapping, 106, and encapsulating, 104, are performed in parallel. In the following operation the IP traffic from said first path and said second path is scheduled, 108, for transmission, 110, to the destination interface device, 506, via the 3GPP wireless network and then onwards to the robot, 508. Of course, as mentioned earlier, instead of a robot a sensor or a device in a robotic cell may be the recipient of the traffic from the PLC, 502.

The operation of remapping in the scenario depicted in FIG. 5 is further explained in the table 1 below. IP packets received by the source interface device, 504, from the PLC, 502, contain addressing of the first robot, 508, e.g. 120.100.1.10/1000. The PLC, 502, and the first robot, 508, operate is the same local network. The source interface device, 504, remaps the IP address from the local network to IP address of a destination interface device, 506, e.g. 10.10.10.2/1000 and with this IP address the packets are transmitted from the source to the destination interface device over the 4G or 5G wireless communications network. Because there is only one robot, 508, connected to the destination interface device, 506, there is no need to perform remapping of the port number. Hence, the value of 10000 is used on all interfaces. This is shown in the right-hand side of table 1 (TX side).

TABLE 1

| TX side | | | | RX side | | | |
|---|---|---|---|---|---|---|---|
| Dest IP | Dest Port | Mapped Dest IP | Mapped Dest port | Received Dest IP | Received Dest port | Demapped Dest IP | Demapped Dest port |
| 120.100.1.10 | 10000 | 10.10.10.2 | 10000 | 10.10.10.2 | 10000 | 120.100.1.10 | 10000 |

Figure 6:
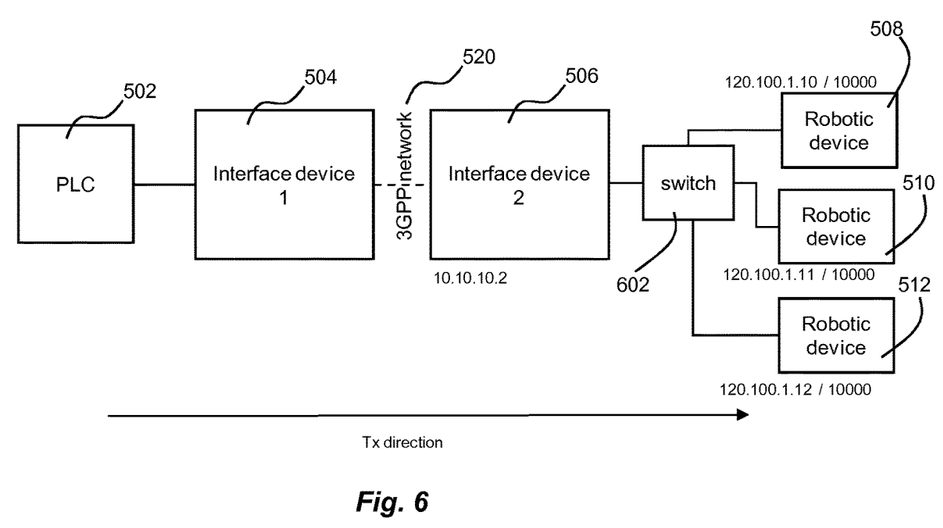

FIG. 6 illustrates a practical deployment of the disclosed solution in which the destination interface device, 506, at the remote end of the 3GPP wireless network is connected to a plurality of controlled devices, 508, 510, 512. The method in this embodiment includes in the operations of remapping, 106, and encapsulating, 104, operations of adding, 106-1 and 104-1, to the IP address of the destination interface device, 506, port numbers for routing the traffic to the respective controlled devices.

The operation of remapping in the scenario depicted in FIG. 6 is similar to the one discussed above with reference to FIG. 5 and table 1. Differences are explained in the table 2 below.

First, the IP packets received by the source interface device, 504, from the PLC, 502, contain addressing of three robots, 508, 510 and 512, connected to the destination interface device, 506, e.g. 120.100.1.10/1000, 120.100.1.11/1000 and 120.100.1.12/1000. These IP addresses are then remapped to the IP address of the wireless network interface of the destination interface device, 506, e.g. 10.10.10.2, but in order to distinguish these three separate streams of traffic they use different port numbers, each port number identifying one of the robots connected to the destination interface device, 506. The IP addresses are remapped to 10.10.10.2/5000, 10.10.10.2/5001 and 10.10.10.2/5002. With these remapped IP addresses, the packets are transmitted from the source to the destination interface device over the 4G or 5G wireless communications network. As shown in table 2, FIG. 6 and the discussion above the port numbers are remapped when there are several robots connected to a single interface device.

TABLE 2

| | TX side | | | RX side | | | |
|---|---|---|---|---|---|---|---|
| Dest IP | Dest Port | Mapped Dest IP | Mapped Dest port | Received Dest IP | Received Dest port | Demapped Dest IP | Demapped Dest port |
| 120.100.1.10 | 10000 | 10.10.10.2 | 5000 | 10.10.10.2 | 5000 | 120.100.1.10 | 10000 |
| 120.100.1.11 | 10000 | 10.10.10.2 | 5001 | 10.10.10.2 | 5001 | 120.100.1.11 | 10000 |
| 120.100.1.12 | 10000 | 10.10.10.2 | 5002 | 10.10.10.2 | 5002 | 120.100.1.12 | 10000 |

Although the above examples described transmission of traffic from a PLC to a single robot or to a plurality of robots the same solution is equally applicable to scenarios in which traffic goes from a single robot to a single PLC and from a plurality of robots connected to one interface device to a plurality of PLCs connected to a single interface device. Also, instead of the robot another controlled device(s) may be implemented in the scenarios illustrated in FIGS. 5 and 6, for example, a sensor or any other device in a robotic cell.

Figure 7:
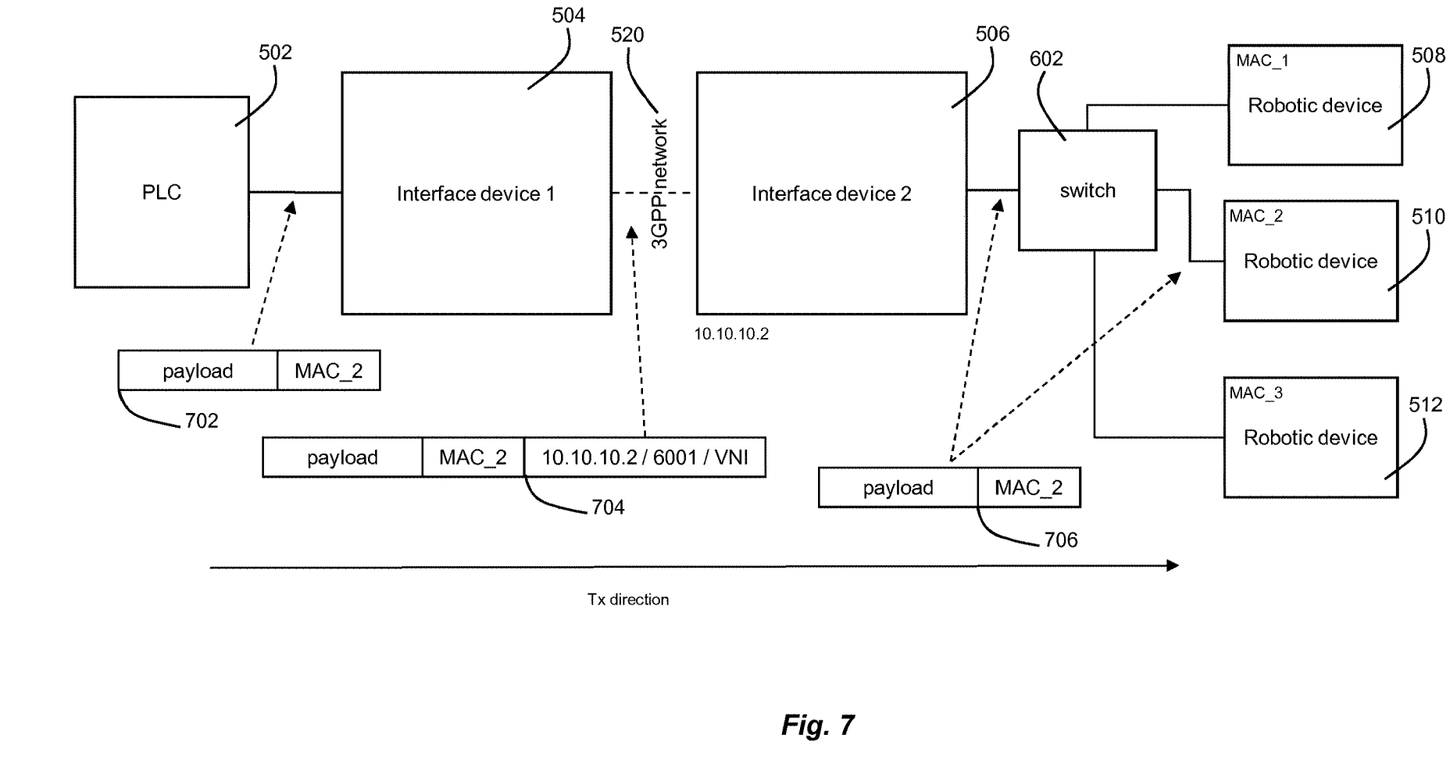
FIG. 7 illustrates the operation of encapsulation of ethernet traffic in one embodiment of the method.

FIG. 7 illustrates handling of native ethernet traffic in the local network and, in particular, encapsulation of the native ethernet traffic for transmission over the 4G or 5G network. The example network illustrated in FIG. 7 is the same as shown in FIG. 6, but for clarity some of the details of IP addressing has been removed.

The source interface device, 502, operates like a bridge (or a switch) on the ethernet side, which means it accepts all the incoming traffic regardless the destination MAC address. In this way the destination MAC address in the frame can be directly set to the one of the robot on the other side. For brevity, we consider here only native ethernet traffic destined for the second robot, 510. The second robot, 510, uses a network interface with a MAC address MAC_2. The PLC, 502, transmits native ethernet traffic to the second robot, 510, by sending to the source interface device, 504, ethernet frames, 702, comprising the MAC_2 address.

The source interface device, 502, performs encapsulation of the ethernet frames by attaching an IP header containing an IP address of the wireless network interface of the destination interface device, 506, together with a port number assigned to a decapsulation function, e.g. 10.10.10.2/6001. This forms an IP packet, 704, that is transmitted over the 4G or 5G network towards the destination interface device, 506.

The ethernet frames and encapsulated ethernet frames are illustrated in FIG. 7 in a simplified form for clarity and brevity. Other ways of illustrating the concept of encapsulation are also possible, but they do not change the teaching of this disclosure.

The above describes a simple situation in which there is only one PLC on one side and one robot on the other side. In scenarios in which there is one PLC and multiple robots the encapsulation process may use a single IP address and single port number assigned to a decapsulation function because after decapsulation the IP header is removed and the ethernet frames will then be forwarded to respective robots based on the MAC addresses, MAC_1, MAC_2 and MAC_3 in the embodiment illustrated in FIG. 7. In scenarios with several PLCs on one side there may be several port numbers used for respective several decapsulation functions. Alternatively, the different decapsulation functions may be identified by encapsulation IDs assigned to the encapsulation/decapsulation functions, as it is, for example, in VxLAN encapsulation. VxLAN is described in detail in standardisation document RFC 7348—"*Virtual eXtensible Local Area Network (VXLAN): A Framework for Overlaying Virtualized Layer 2 Networks over Layer 3 Networks*". In yet another alternative embodiment even in scenarios with several PLCs on one side of the 4G/5G wireless network and several robots on the other side a single decapsulation function may be used (and single port number assigned to this decapsulation function) because once the IP header is removed by the decapsulation function then the revealed MAC address is used for forwarding the ethernet frame to its destination robot.

In one embodiment the operation of encapsulating comprises adding, 104-2, to an IP header an identifier (ID) associated with the encapsulation operation. In the case of VxLAN encapsulation the encapsulation ID is called VxLAN Network Identifier or VNI and it is located in VxLAN header (i.e. the header added during encapsulation). This is shown in a very simplified form in element 704 in FIG. 7. In alternative embodiments other methods of encapsulating can be used, for example methods using VPN, like OpenVPN or IPsec. In these methods data are encapsulated into IP packets (TCP, UDP) with a proper header. The main difference compared to VxLAN is the encryption used in VPN based encapsulation, which increases their complexity compared with VxLAN.

The traffic received from the PLC by the source interface device comprise a mixture of IP traffic and ethernet. In a preferred embodiment the ethernet is an industrial ethernet, for example, Profinet, EtherCAT), etc. In a preferred embodiment the operation of splitting, 102, comprises forwarding packets with IP headers to the second path and forwarding the remaining packets to the first path. In this way the traffic for IP remapping is separated from the traffic for IP encapsulation.

In a preferred embodiment the operation of scheduling, 108, prioritizes real time control traffic over configuration and management traffic. Typically, native ethernet traffic present on the first path after splitting has the highest priority, whereas TCP/UDP present on the second path after splitting is commonly used for management and monitoring purposes and thus has lower priority. Several types of scheduling mechanisms can be adopted for this purpose. In one embodiment Weighted Round Robin (WRR) may be used for scheduling. In alternative embodiments, however, different scheduling techniques may be used, for example Weighted Fair Queuing (WFQ), Strict Priority, Priority-Based Deficit Weighted Round Robin and few others.

Scheduling functionality is useful to reduce jitter when the 4G/5G wireless module, 306, is of a category with an uplink bandwidth lower than the local network connecting robots and PLCs to their respective interface devices, 504 and 506 (e.g. cat. 4 LTE dongle has 50 Mbps uplink rate compared to 100 Mbps of the LAN). It is also important to note that the encapsulation mechanism can affect the maximum throughput of the interface device, 504, 506, and scheduling is the needed to handle time critical services with a low jitter.

Because scheduling gives preferential treatment to traffic with higher priority over traffic with lower priority the solution includes queues in which the traffic is queued waiting for transmission.

Figure 2:
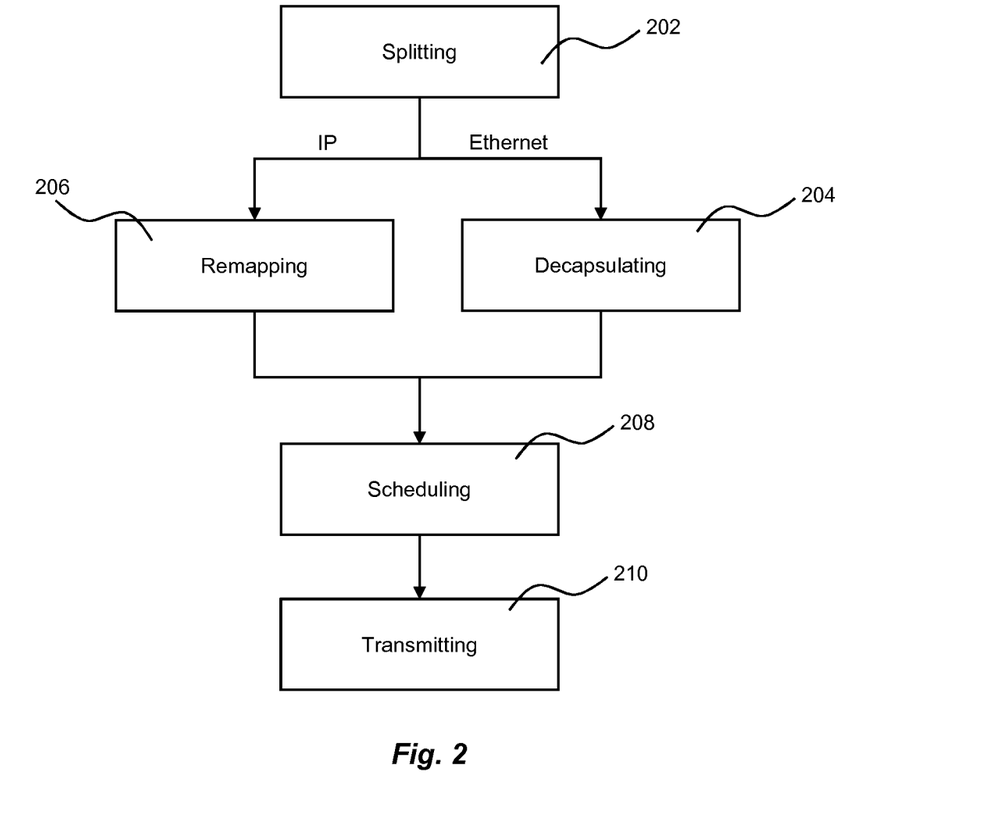
FIG. 2 is a flow chart illustrating a method of communication between a controlled device and a controller over a 3GPP wireless network in another embodiment of the present invention.

With reference to FIG. 2 one embodiment of a method of communication between a controlled device, 508, 510, 512, and a controller, 502, over a 3GPP wireless network, 520, will now be described. The method is performed at a destination interface device, 506, and comprises splitting, 202, an incoming traffic into a third path carrying a native ethernet traffic encapsulated in an IP, internet protocol, packets and a fourth path carrying an IP traffic. The destination interface device, 506, receives the traffic over the 3GPP wireless network, 520, which, as previously described, in a preferred embodiment may be a 4G or 5G network. The packets of the traffic are addressed with IP address of the 3GPP wireless network interface of the destination interface device, 506. In the examples illustrated in FIGS. 5, 6 and 7 this IP address is 10.10.10.2. The received packets are further addressed with port numbers that allows for distinguishing traffic for different robots, 508-512, connected to the destination interface device, 506, as well as traffic that contains encapsulated ethernet frames. The part of the received traffic that carries encapsulated ethernet frames use port numbers assigned to a decapsulation function. Additionally, for some types of encapsulation the headers of traffic carrying encapsulated ethernet frames comprise encapsulation ID (e.g. VNI in the case of VxLAN encapsulation). If the VxLAN encapsulation is used, the encapsulated native ethernet traffic is defined by the VxLAN identifier (VNI) and the IP address and port of the VxLAN. In this case the traffic splitter behaves like a router. The packets with IP address and port associated to a VxLAN are routed towards the decapsulation function, while the rest of the IP traffic is sent to the TCP/UDP queueing system. Optionally, the traffic splitter can also check the VxLAN identifier, in case of the setting up of more than one VxLAN, situation typically occurring in correspondence of the PLC side. Therefore, the operation of splitting in one embodiment may forward onto the third path (and to the decapsulation function) the packets with the port number assigned to the decapsulation function or, in an alternative embodiment, the operation of splitting may forward IP packets containing the encapsulation ID (e.g. VNI) to the third path. The remaining part of the traffic is forwarded to the fourth path.

Once the traffic is split, the part on the third path is decapsulated, 204, and the original native ethernet frames are produced after removing the IP header. In embodiments using VxLAN or VPN based encapsulation also the corresponding headers must be removed and in the case of VPN the data should be also deciphered. On the fourth path remapping, 206, of IP addresses of the received packets with an IP address of at least one controlled device or controller is carried out. In the scenario illustrated in FIGS. 5-7 the traffic flows from the PLC controller 502 to robots 508-512, but the solution works in the same way if the traffic flows from the robots 508-512 to the PLC controller 502.

Before the traffic is transmitted, 210, from the destination interface device, 506, to the robot, 508, or robots, 508-512, the traffic undergoes scheduling, 208. In a preferred embodiment the operation of scheduling, 208, prioritizes real time control traffic over configuration and management traffic.

The operation of remapping in the scenario depicted in FIG. 5 (a single robot, 508, connected to the destination interface device, 506) is explained in the table 1 (RX side) presented earlier. The native IP packets (i.e. the ones that do not carry encapsulated ethernet frames) are received with IP address 10.10.10.2 of the wireless network interface of the destination interface device, 506, and the port number 10000. The IP address 10.10.10.2 is remapped to the local IP address 120.100.1.10 of the robot, 508. The port number remains the same as there is only one robot connected to the destination interface device and there was no need to distinguish traffic sent from the source interface device to the destination interface device.

The operation of remapping in the scenario depicted in FIG. 6 is similar to the one discussed above with reference to FIG. 5 and table 1. Differences are explained in the table 2 (RX side) presented earlier. The packets arriving at the destination interface device, 506, from the 3GPP wireless network are addressed with the IP address 10.10.10.2 of the wireless network interface of the destination interface device, 506, and are further distinguished by different port numbers assigned to the robots, 508-512, connected to the destination interface device, 506, i.e. 10.10.10.2/5000, 10.10.10.2/5001 and 10.10.10.2/5002. In this scenario IP addresses and port numbers used on the wireless interface are remapped to IP addresses and port numbers used by the robots, 508-512, in the LAN, i.e. 120.100.1.10/1000, 120.100.1.11/1000 and 120.100.1.12/1000. The traffic directed to these three robots illustrated in FIG. 6 is forwarded to its recipients by a switch 602. The switch, 602, illustrated in FIGS. 6 and 7 as a separate component and its function is to connect all ethernet ports together and forward traffic to intended destinations. In an alternative embodiment the interface device, 506, may have a port for each robot and the switch function would then be located inside the interface device, 506, after the scheduler.

Figure 3:
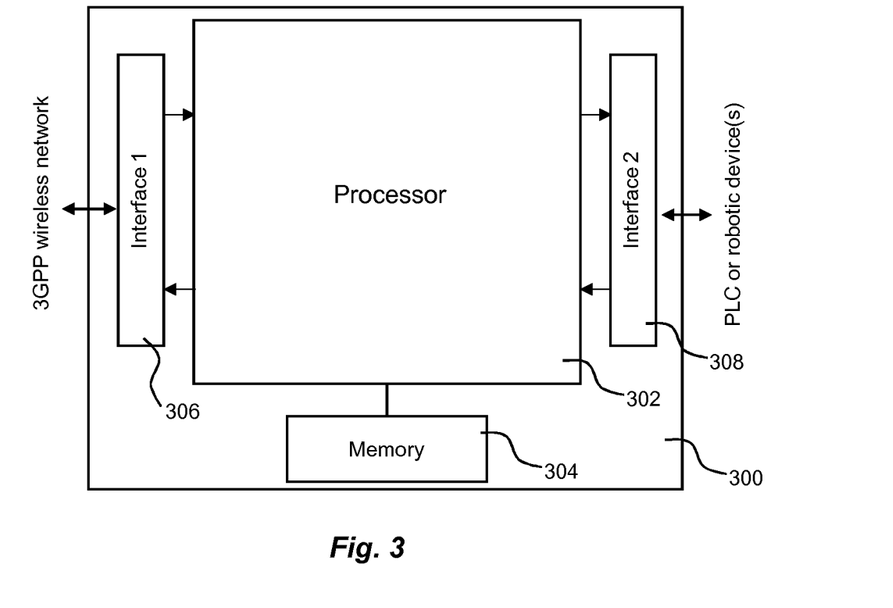
FIGS. 3 and 3a are diagrams illustrating interface device for communication between a controlled device and a controller over a 3GPP wireless network in one embodiment of the present invention.

With reference to FIG. 3 an embodiment of an interface device, 300, for communication between a controlled device and a controller over a 3GPP wireless network will now be described. In this embodiment the interface device 300 is adapted to operate as a source interface device (e.g. device 504 in FIGS. 5-7). In a preferred embodiment the interface device, 300, comprises a processing circuitry, 302, and a memory, 304. The memory, 304, contains instructions executable by the processing circuitry, 302, such that the interface device, 300, is operable to split an incoming traffic into a first path carrying native ethernet traffic and a second path carrying IP, internet protocol, traffic. The interface device, 300, is also operable to remap IP addresses of packets of the IP traffic with an IP address of a destination interface device at a remote end of the 3GPP wireless network and to encapsulate the native ethernet traffic into IP traffic with the IP address of the destination interface device at a remote end of the 3GPP wireless network. Further, the interface device, 300, is operable to schedule IP traffic from the first path and the second path for transmission to the destination interface device via the 3GPP wireless network.

The processing circuitry, 302, may be a single off-the-shelf processor or multiple off-the-shelf processors and it also may be a dedicated Application Specific Integrated Circuit (ASIC), or any other type of processing circuitry including digital or analog hardware components or special purpose processors. Similarly, the memory, 304, may be one or more memory modules produced in one of the known technologies.

The interface device, 300, when operating as a source interface device, is operable to perform the various embodiments of the method illustrated in FIG. 1 and described above.

In yet another embodiment, an interface device, 300, for communication between a controlled device and a controller over a 3GPP wireless network is now to be described. One embodiment of this interface device is illustrated in FIG. 3. In this embodiment the interface device, 300, is adapted to operate as a destination interface device, 506, illustrated in FIGS. 5-7. The interface device, 300, comprises a processing circuitry, 302, and a memory, 304. As explained above the processing circuitry and the memory may be realised as a single module or as plurality of modules in various technologies. The memory, 304, contains instructions executable by the processing circuitry, 302, such that the interface device, 300, is operable to split an incoming traffic into a third path carrying native ethernet traffic encapsulated in an IP, internet protocol, packets and a fourth path carrying IP traffic. The interface device, 300, is also operable to remap IP addresses of packets of the IP traffic on the fourth path with an IP address of at least one controlled device or controller and to decapsulate the native ethernet traffic from the IP traffic on the third path. Further, the interface device, 300, is operable to schedule traffic from the third path and the fourth path for transmission to the at least one controlled device or controller connected to the interface device.

The interface device, 300, when operating as a source interface device, is operable to perform the various embodiments of the method illustrated in FIG. 2 and described above.

Figure 4:
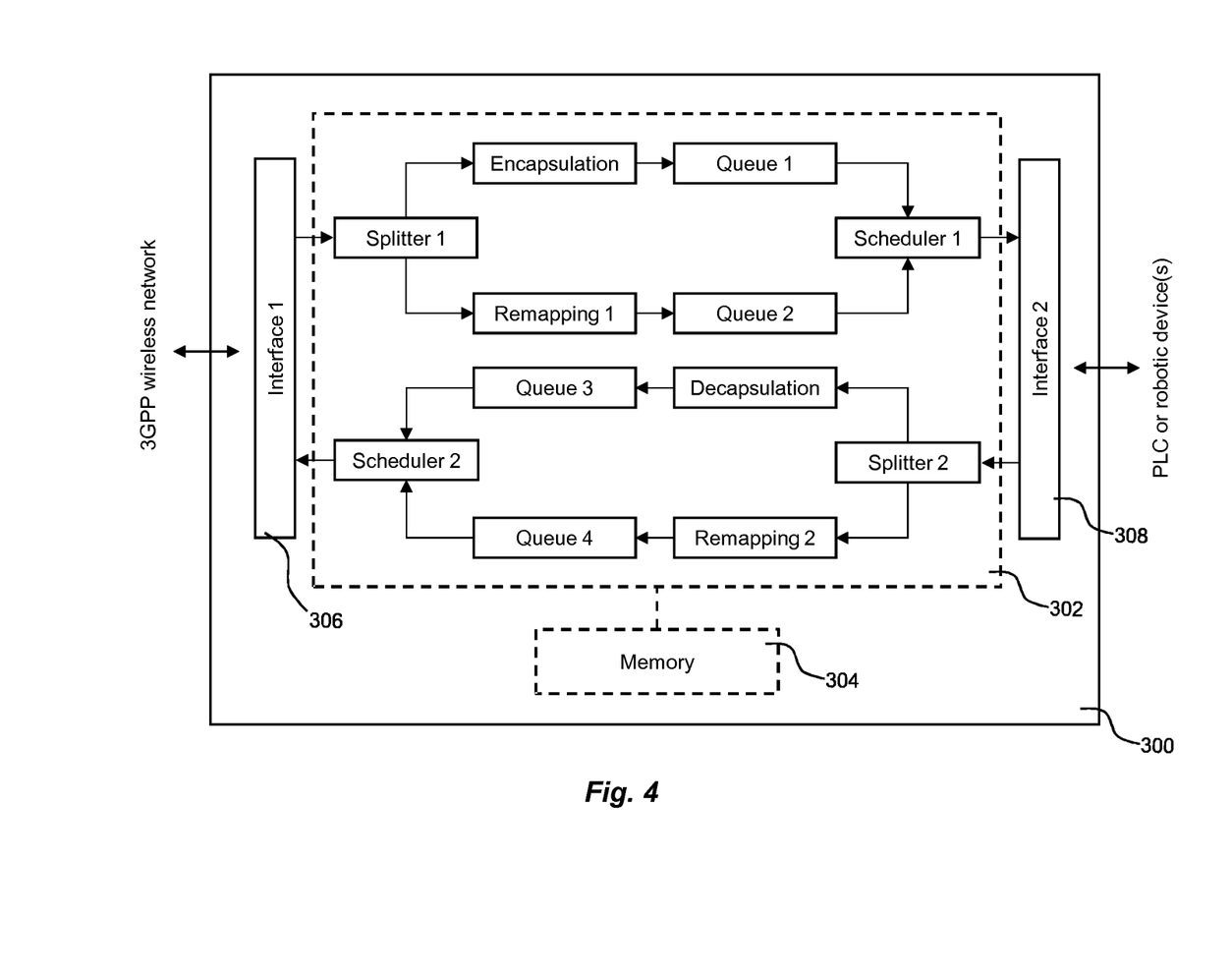
FIG. 4 is a diagram illustrating interface device for communication between a controlled device and a controller over a 3GPP wireless network in one embodiment of the present invention.

Although the interface device, 300, has been described above separately as adapted to operate as a source interface device and as a destination interface device in a preferred embodiment the interface device is adapted to carry out both functions, i.e. source and destination interface device. In practical deployments traffic is exchanged between a PLC and a robot in both directions and therefore an interface device connected to the PLC receives traffic from the PLC to the robot and also receives traffic from the robot to the PLC. One embodiment of the interface device 300 that combines the function of the source and destination is illustrated in FIG. 4. The functional modules illustrated in FIG. 4 correspond the operation of the methods in their various embodiments described earlier. In one embodiment these functional modules may be implemented by software in the processing circuitry, 302, or, alternatively, they may be implemented in a dedicated hardware (e.g. when the processing circuitry is implemented as an ASIC device).

Figure 3A:
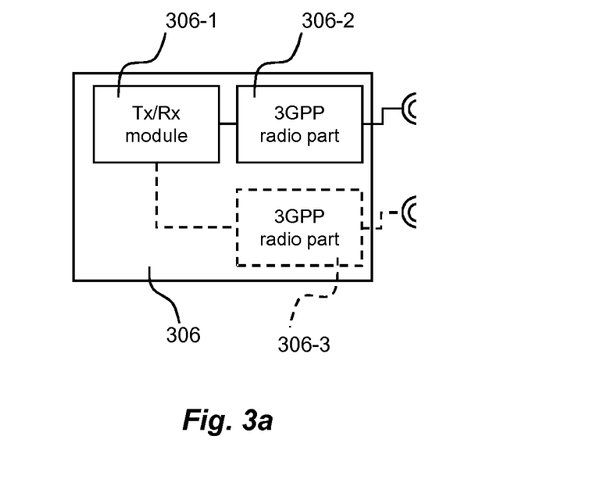

One of the advantages of this solution is that the interface device and the method allow for optimal use of 4G or 5G connections in industrial scenarios even if the PLC and robots use for communication industrial protocols partially or totally based on ethernet (e.g. Profinet, EtherCAT, EthernetIP). In other words, the present solution allows for introduction of 4G and/or 5G connections without requiring changes on the legacy PLC and robots. The communication through the mobile wireless network is set up and torn down automatically and industrial traffic transport is optimised based on its characteristics. On the terminal side the interface device, 306, includes also the 4G/5G radio circuitry, 306-2, and the related software. This is illustrated in FIG. 3a.

The interface device, 300 allows for transmission and reception of industrial ethernet traffic over the 4G/5G network using a dedicated transmission and reception module, 306-1. In one embodiment the Tx part of the module 306-1, receives industrial ethernet traffic from the PLC (or the robot), splits traffic separating TCP/UDP traffic and native ethernet traffic and sends them to the robot device (or PLC) via the 4G or 5G wireless network, encapsulating the Ethernet traffic in IP and remapping native IP traffic as described above.

Figure 8:
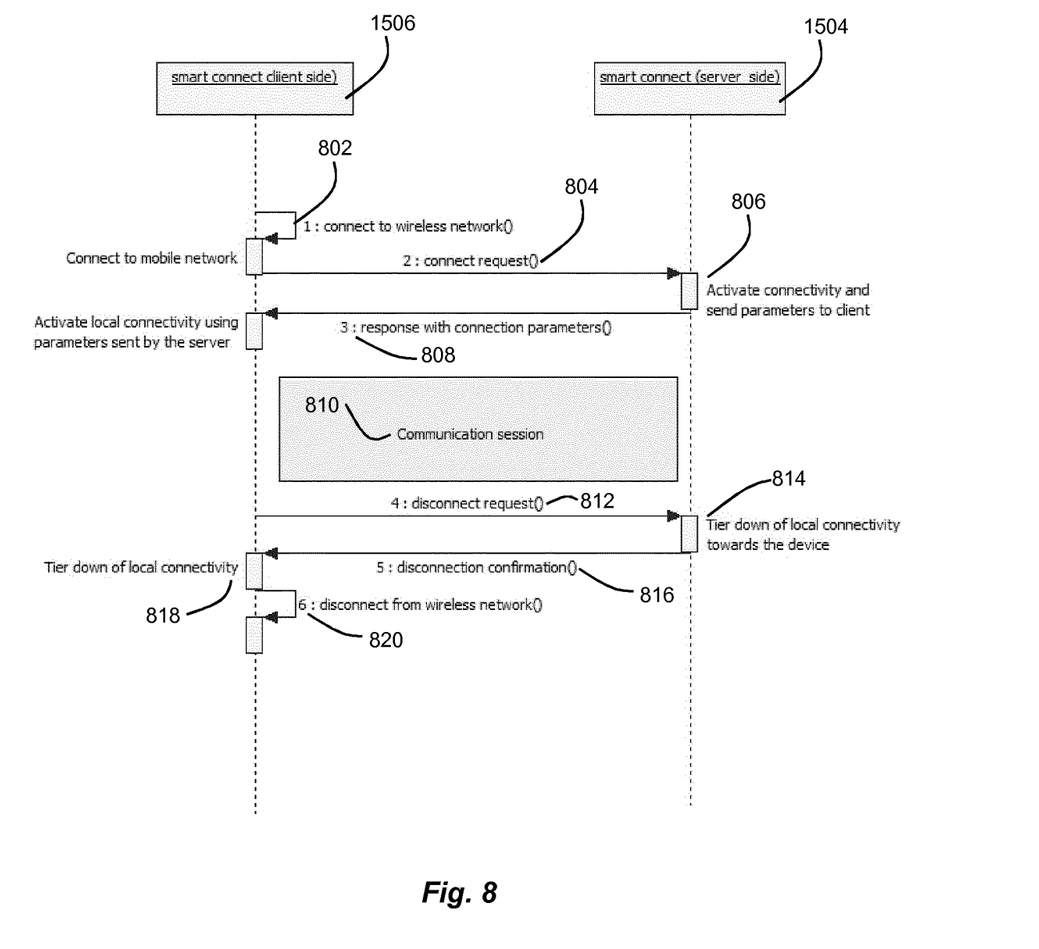
FIG. 8 is a message sequence chart illustrating connecting and disconnecting of interface devices illustrated in FIGS. 3 and 4.

In operation, the interface device may act as server or as client in the process of setting up communication. This is illustrated in FIG. 8. In a typical embodiment the interface device, 300, attached to the PLC acts as a server, 1504, while the others, connected to robots, sensors, devices in robotic cells, etc, operate as clients, 1506. When a new interface device wants to connect to the network, first it tries to connect to the wireless network, 802. If this succeeds, then it tries to reach the server, 1504, at a specific address. The latter can be pre-set or can be acquired connecting to a DNS service. The client, 1506, sends a connect request, 804, to the server, 1504, including as information its IP address in the wireless network at least. The server, 1504, then can authenticate the client, 1506, and sets the local configuration for creating the encapsulated path, 806. Then, it sends back to the client, 1506, the result of the operation including the information for identifying the encapsulated traffic flow (e.g. the VxLAN identification parameters), 808. After this the interface devices and their connected PLC and robots communicate, 810, with each other over the 4G or 5G wireless network.

Disconnection of a client interface device, 1506, follows the procedure shown in FIG. 8. The client interface device, 1506, sends a disconnect request, 812, in response to which the server interface device, 1504, tears down, 814, the local connection towards the client interface device, 1506, and then sends disconnection confirmation, 816. On the client side, the client interface device, 1506, tears down, 818, the local connection towards the server interface device, 1504, and then disconnects from the wireless network, 820.

In one embodiment the wireless part of the interface device may be protected using a second radio device implementing a 1:1 protection scheme on the radio path. In the case of a failure of a first radio circuitry, 306-2, or the wireless network to which the first radio circuitry, 306-2, is connected, the protection procedure may switch the traffic to the second radio circuitry, 306-3, which may be connected to the same 4G or 5G wireless network as the first radio circuitry, 306-2, or to a different wireless network.

One practical aspect of the protection scheme described here refers to the IP address assigned to the second radio circuitries 306-2 and 306-3. The second radio circuitry, 306-3 is identified by a different IP address than the first radio circuitry, 306-2. When a switchover occurs, new encapsulation is created changing the IP addresses in the tables. In the case of a VxLAN encapsulation a new VxLAN Network Identifier (VNI) will be used.

The method and the interface device in their various embodiments described above enable communication between a controlled device and its controller that benefits from the wealth of features of a 3GPP wireless network (in particular $4^{th}$ and $5^{th}$ generations). Although the solutions described herein and illustrated in the figures are mostly based on a direction of traffic from a PLC to a robot (or multiple robots) the same solutions are applicable to traffic travelling in the opposite direction, i.e. from a robot (or multiple robots) to a PLC or (multiple PLCs).

Although this document discloses embodiments of the invention by using examples of PLC controllers and robots, this solution defined in the claims may be equally applied to other types of controllers and controlled devices, for example to surgical devices and controllers for controlling surgical devices for medical procedures. Other applications of embodiments of the invention described above include control of chemical and other industrial processes.

The invention claimed is:

1. A method of communication between a controlled device and a controller over a 3GPP wireless network the method performed at a source interface device comprising:

splitting an incoming traffic into a first path carrying a native ethernet traffic and a second path carrying an IP, internet protocol, traffic;

remapping IP addresses of packets of the IP traffic with an IP address of a destination interface device at a remote end of the 3GPP wireless network;

encapsulating the native ethernet traffic into IP traffic with the IP address of the destination interface device at a remote end of the 3GPP wireless network;

scheduling IP traffic from said first path and said second path for transmission to the destination interface device via the 3GPP wireless network.

2. The method according to claim 1, wherein if the destination interface device at the remote end of the 3GPP wireless network is connected to a plurality of controlled devices the operations of remapping and encapsulating comprise adding to the IP address of the destination interface device at a remote end of the 3GPP wireless network port numbers for routing the traffic to the respective controlled devices.

3. The method according to claim 1, wherein the incoming traffic comprises an industrial ethernet traffic.

4. The method according to claim 1, wherein the operation of splitting comprises forwarding packets with IP headers to the second path and forwarding the remaining packets to the first path.

5. The method according to claim 1, wherein the operation of scheduling prioritizes real time control traffic over configuration and management traffic.

6. The method according to claim 1, wherein the operation of encapsulating comprises adding to the IP address of the destination interface device a predefined port number assigned to a decapsulation operation.

7. The method according to claim 1, wherein the operation of encapsulating comprises adding to an IP header an identifier associated with the encapsulation operation.

8. The method according to claim 1, comprising protection switching of the scheduled traffic from a first radio circuitry to a second radio circuitry.

9. An interface device for communication between a controlled device and a controller over a 3GPP wireless network the interface device comprising a processing circuitry and a memory, the memory containing instructions executable by the processing circuitry such that the interface device is operable to:

split an incoming traffic into a first path carrying native ethernet traffic and a second path carrying IP, internet protocol, traffic;

remap IP addresses of packets of the IP traffic with an IP address of a destination interface device at a remote end of the 3GPP wireless network;

encapsulate the native ethernet traffic into IP traffic with the IP address of the destination interface device at a remote end of the 3GPP wireless network;

schedule IP traffic from the first path and the second path for transmission to the destination interface device via the 3GPP wireless network.

10. The interface device according to claim 9, wherein if the destination interface device at the remote end of the 3GPP wireless network is connected to a plurality of controlled devices the interface device is operable to add, in the operations of remapping and encapsulating, port numbers for routing the traffic to the respective controlled devices to the IP address of the destination interface device.

11. The interface device according to claim 9 operable to forward packets with IP headers to the second path and forward the remaining packets to the first path in the operation of splitting.

12. The interface device according to claim 9 operable to prioritize real time control traffic over configuration and management traffic in the operation of scheduling.

13. The interface device according to claim 9 operable to add, in the operation of encapsulating, to the IP address of the destination interface device a predefined port number assigned to a decapsulation operation.

14. The interface device according to claim 9 operable to add, in the operation of encapsulating, to an IP header an identifier associated with the encapsulation operation.

* * * * *